(12) United States Patent
Allen

(10) Patent No.: US 8,733,239 B2
(45) Date of Patent: May 27, 2014

(54) FOOD PROCESSOR

(75) Inventor: Michael W. Allen, Glen Allen, VA (US)

(73) Assignee: Hamilton Beach Brands, Inc., Glen Allen, VA (US)

( * ) Notice: Subject to any disclaimer, the term of this patent is extended or adjusted under 35 U.S.C. 154(b) by 1210 days.

(21) Appl. No.: 12/504,378

(22) Filed: Jul. 16, 2009

(65) Prior Publication Data

US 2011/0011281 A1  Jan. 20, 2011

(51) Int. Cl.
*A23N 4/04*  (2006.01)

(52) U.S. Cl.
USPC .............. 99/537; 99/538; 99/584; 99/595; 241/151; 241/152.1; 241/152.2; 241/153; 241/154; 241/155; 241/156; 241/157; 241/158; 241/159; 366/150.1; 83/865

(58) Field of Classification Search
CPC .... B02C 23/04; A47J 43/046; A47J 43/0716; A47J 43/04
USPC ............ 99/537–538, 584, 595; 241/151–159; 366/150.1; 83/865
See application file for complete search history.

(56) References Cited

U.S. PATENT DOCUMENTS

| | | | | |
|---|---|---|---|---|
| 2,227,098 A | * | 12/1940 | MacLean | 99/512 |
| 3,511,288 A | * | 5/1970 | Swett et al. | 206/45.2 |
| 4,134,205 A | * | 1/1979 | Heling | 30/287 |
| D251,231 S | | 3/1979 | Hashimoto | |
| D254,161 S | | 2/1980 | Verdun | |
| 4,206,845 A | * | 6/1980 | Christian | 206/508 |
| 4,387,860 A | | 6/1983 | Necas et al. | |
| 4,412,292 A | * | 10/1983 | Sedam et al. | 700/241 |
| 4,799,626 A | * | 1/1989 | Hickel et al. | 241/37.5 |
| 4,874,083 A | * | 10/1989 | Antoni et al. | 220/523 |
| 5,216,031 A | * | 6/1993 | Dobson et al. | 99/538 |
| D395,573 S | | 6/1998 | Leverrier | |
| D426,423 S | | 6/2000 | Lee | |
| 6,076,452 A | * | 6/2000 | Dessuise | 99/410 |
| 6,127,185 A | * | 10/2000 | Melton et al. | 436/60 |
| D445,299 S | | 7/2001 | Spagnolo et al. | |
| D445,636 S | | 7/2001 | Spagnolo | |
| 6,748,853 B1 | * | 6/2004 | Brady et al. | 99/492 |
| 6,805,312 B2 | * | 10/2004 | Capp | 241/36 |
| 6,886,972 B2 | * | 5/2005 | Buchsteiner | 366/154.2 |
| 6,971,597 B2 | * | 12/2005 | Starr | 241/92 |
| 7,032,507 B2 | * | 4/2006 | Cai | 99/323 |
| 7,159,808 B2 | * | 1/2007 | Starr | 241/92 |
| 7,168,845 B2 | * | 1/2007 | McGill | 366/204 |
| D539,080 S | | 3/2007 | Zhiwen et al. | |
| 7,213,965 B2 | * | 5/2007 | Daniels, Jr. | 366/192 |

(Continued)

*Primary Examiner* — Henry Yuen
*Assistant Examiner* — Brett Spurlock
(74) *Attorney, Agent, or Firm* — Alexander D. Raring (57) ABSTRACT

A food processor includes a base, a container having a side wall and an open end including a rim, and a lid for engaging the open end of the container in an operating position and a storage position. The lid has a top wall with a first and second principal surface, an annular ledge with a first and second side, and a food chute extending from the first principal surface generally parallel to a longitudinal axis of the top wall. The food chute has a length and extends away from the container with the second side of the annular ledge contacting the rim of the container when the lid is in the operating position. When the lid is in the storage position, the food chute extends into an interior of the container with the first side of the annular ledge contacting the rim of the container.

13 Claims, 6 Drawing Sheets

(56) References Cited

U.S. PATENT DOCUMENTS

| | | |
|---|---|---|
| D547,601 S | 7/2007 | Ting et al. |
| 7,338,001 B2 * | 3/2008 | Galban et al. ............... 241/282.1 |
| 7,428,864 B2 * | 9/2008 | Wengrovsky ............... 99/646 C |
| 7,617,766 B2 * | 11/2009 | Tracy et al. ...................... 99/413 |
| 2003/0024402 A1 * | 2/2003 | Rosa ................................ 99/467 |
| 2005/0056161 A1 * | 3/2005 | Le Rouzic ....................... 99/511 |
| 2005/0068847 A1 * | 3/2005 | Sands ............................ 366/205 |
| 2005/0145638 A1 * | 7/2005 | Van Handel et al. .......... 220/782 |
| 2005/0207273 A1 * | 9/2005 | Newman et al. .............. 366/314 |
| 2005/0223906 A1 * | 10/2005 | Xu et al. .......................... 99/348 |
| 2005/0269434 A1 * | 12/2005 | Starr ............................... 241/92 |
| 2006/0169812 A1 * | 8/2006 | Galban et al. ............... 241/282.1 |
| 2006/0171249 A1 * | 8/2006 | Dickson, Jr. ................... 366/205 |
| 2006/0176765 A1 * | 8/2006 | Pryor et al. .................... 366/192 |
| 2006/0176769 A1 * | 8/2006 | Baschnagel, III ............. 366/205 |
| 2006/0176770 A1 * | 8/2006 | Sands ............................ 366/205 |
| 2006/0209627 A1 * | 9/2006 | McGill .......................... 366/205 |
| 2007/0030757 A1 * | 2/2007 | Nabilsi .......................... 366/195 |
| 2007/0041268 A1 * | 2/2007 | Beesley et al. ................ 366/195 |
| 2007/0062965 A1 * | 3/2007 | Anderson et al. ............. 220/912 |
| 2007/0102551 A1 * | 5/2007 | Obersteiner et al. ........ 241/282.1 |
| 2007/0122516 A1 * | 5/2007 | Qian .............................. 425/200 |
| 2007/0194032 A1 | 8/2007 | Leung et al. |
| 2007/0252024 A1 * | 11/2007 | Barraclough .................... 241/92 |
| 2008/0047439 A1 * | 2/2008 | Tracy et al. ..................... 99/339 |
| 2008/0110914 A1 * | 5/2008 | Anderson et al. ............. 220/912 |
| 2008/0111011 A1 | 5/2008 | Wang |
| 2008/0121550 A1 * | 5/2008 | Anderson et al. ............. 206/562 |
| 2008/0121551 A1 * | 5/2008 | Anderson et al. ............. 206/567 |
| 2008/0121552 A1 * | 5/2008 | Anderson et al. ............. 206/567 |
| 2008/0124440 A1 * | 5/2008 | Anderson et al. ............. 426/523 |
| 2008/0128313 A1 * | 6/2008 | Anderson et al. ............. 206/565 |
| 2008/0156913 A1 * | 7/2008 | Orent ........................... 241/37.5 |
| 2008/0163768 A1 * | 7/2008 | Glucksman et al. ............ 99/537 |

* cited by examiner

FOOD PROCESSOR

BACKGROUND OF THE INVENTION

The present invention is directed to processing foodstuff and, more particularly, to a food processor lid that that is configured to provide for convenient and efficient storage of the food processor and all of its associated components during shipment and during storage by the end user.

Food processors or other such appliances have become popular and are commonly used in residential and/or commercial kitchens or other locations where foodstuff is prepared. However, despite their popularity, food processors generally have a bulky structure and include many processing components, such that they often prove unwieldy to store when not in use. For example, food processors commonly include a container, a lid with a food chute extending generally perpendicularly from the top surface of the lid, a food pusher that is slideably positionable within the food chute, a processing disc, and a rotary blade. Because of the overall configuration of the lid and because of the length of the food chute, it is often difficult to store the lid with the rest of the components of the food processor in an efficient and compact manner. For example, many consumers typically store the rotary blade and container together and separately store the lid and food pusher together. Thus, storage of the food processor generally takes up much space in the consumer's drawers, cabinets, etc.

Therefore, it would be desirable to create a lid for a container of a food processor with a structure enabling compact and efficient storage of all of the food processor components. Specifically, it would be desirable to create a lid that is configured to be inverted on a container of a food processor, such that the lid fits comfortably with the container in the inverted position and all of the processing tools can be stored together with the lid and container.

BRIEF SUMMARY OF THE INVENTION

Briefly stated, the present invention is directed to a food processor including a base, a container having a side wall and an open end including a rim, and a lid for engaging the open end of the container in an operating position and a storage position. The lid comprises a top wall having a first principal surface and a second principal surface, an annular ledge having a first side and a second side, and a food chute extending from the first principal surface of the top wall generally parallel to a longitudinal axis of the top wall. The food chute has a length and extends away from the container with the second side of the annular ledge contacting the rim of the open end of the container when the lid is in the operating position. The food chute extends into an interior of the container with the first side of the annular ledge contacting the rim of the open end of the container when the lid is in the storage position.

BRIEF DESCRIPTION OF THE SEVERAL VIEWS OF THE DRAWINGS

The following detailed description of the preferred embodiment of the invention will be better understood when read in conjunction with the appended drawings. For the purpose of illustrating the invention, there is shown in the drawings an embodiment which is presently preferred. It should be understood, however, that the invention is not limited to the precise arrangements and instrumentalities shown.

In the drawings.

DETAILED DESCRIPTION OF THE INVENTION

Certain terminology is used in the following description for convenience only, and is not limiting. The words "right," "left," "upper," and "lower" designate directions in the drawings to which reference is made. The words "inwardly" and "outwardly" refer to directions toward and away from, respectively, the geometric center of the container or lid and designated parts thereof. Additionally, the word "a" as used in the specification means "at least one." The terminology includes the words specifically mentioned, derivatives thereof and words of similar import.

Referring to the drawings in detail, wherein like numerals indicate like elements throughout, there is shown in FIGS. 1-6 a preferred embodiment of a food processor, generally indicated 10, having a lid 30, in accordance with the present invention. The lid 30 is preferably removably mountable to an upper open end or rim 20 of a container 18 of the food processor 10 configured to process foodstuff. It will be understood by those skilled in the art that the lid 30 is not limited to being used in conjunction with the food processor 10 as shown in the FIG. 1, but may be used with virtually any other food processor or processing apparatus.

Figure 1:
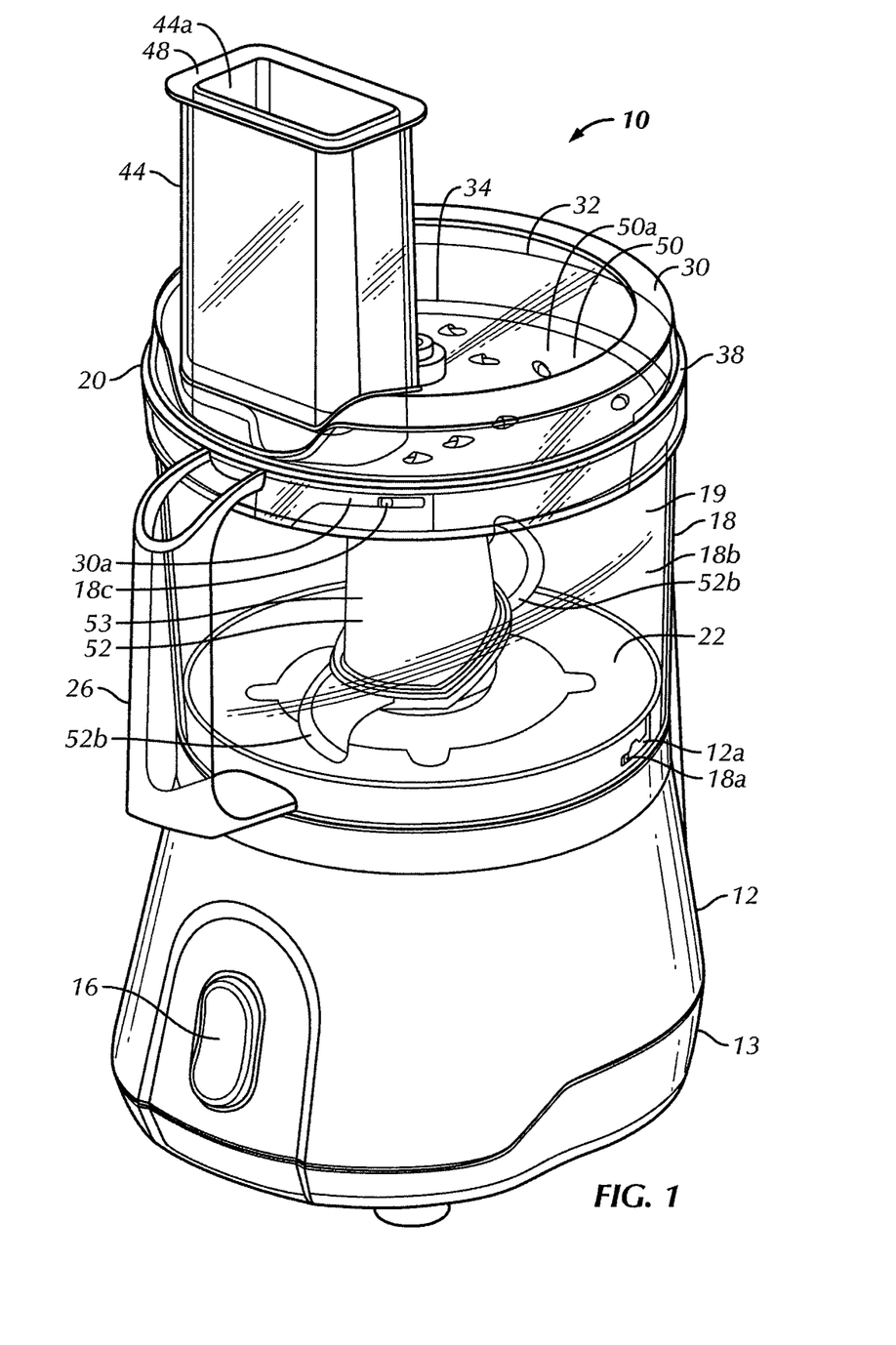
FIG. 1 is a top perspective view of a food processor in an operating position in accordance with the preferred embodiment of the present invention.

Referring to FIG. 1, the food processor 10 includes a base 12, the container 18, and the lid 30. The base 12 is situated within a lower housing 13 and has a generally a cylindrical shape. The base 12 may be made of any appropriate material or construction, such as a polymer or metal. The base 12 houses a motor (not shown), which is preferably a conventional electric motor and is operatively engaged with a drive shaft 14 to cause the drive shaft 14 to rotate (see FIG. 4). A terminal end 14a of the drive shaft 14 extends upwardly away from the base 12 and has a locking member or central boss 15 removably engaged thereto and rotatable therewith. It will be understood by those skilled in the art that the central boss or locking member 15 may also be referred to as a locking nut, a locking ring, etc. The locking member 15 has a generally cylindrical shape with a planar base 15c, an inner cross sectional area 15a and an outer cross sectional area 15b. The inner cross sectional area 15a is of a sufficient size to removably engage with the terminal end 14a of the drive shaft 14. The outer cross sectional area is of a sufficient size to fit through a central aperture 32a of the lid 30, as described in more detail below. The base 12 further has an operating switch 16 electrically connected to the motor (not shown) to enable a user to turn the motor on or off. Although the operating switch 16 is portrayed as a toggle switch, it will be understood by those skilled in the art that the operating switch 16 could take another form, such as a push button or a series of push buttons, a dial, a slide switch, or the like.

Figure 2:
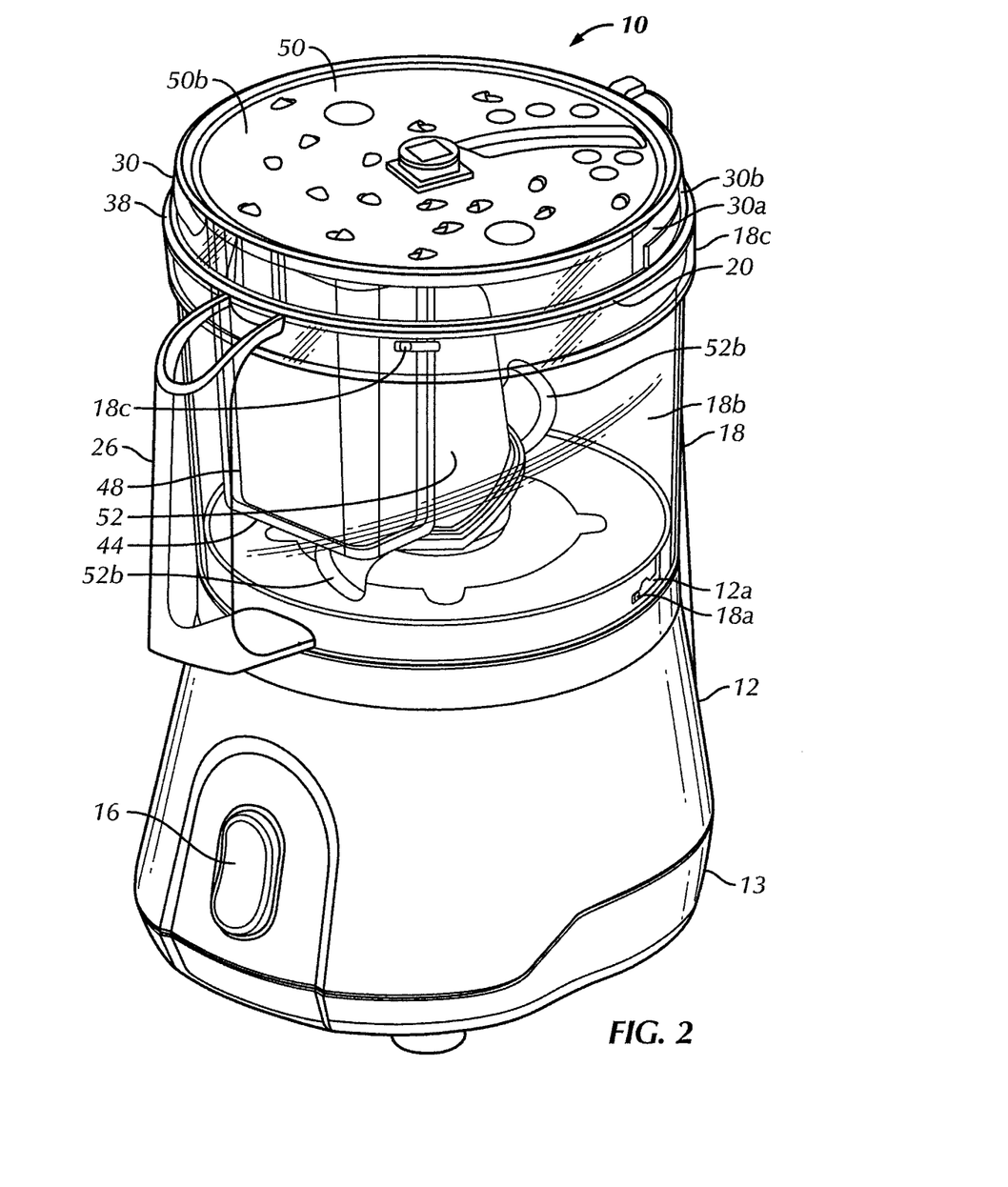
FIG. 2 is a top perspective view of the food processor shown in FIG. 1, in a storage position.
Figure 3:
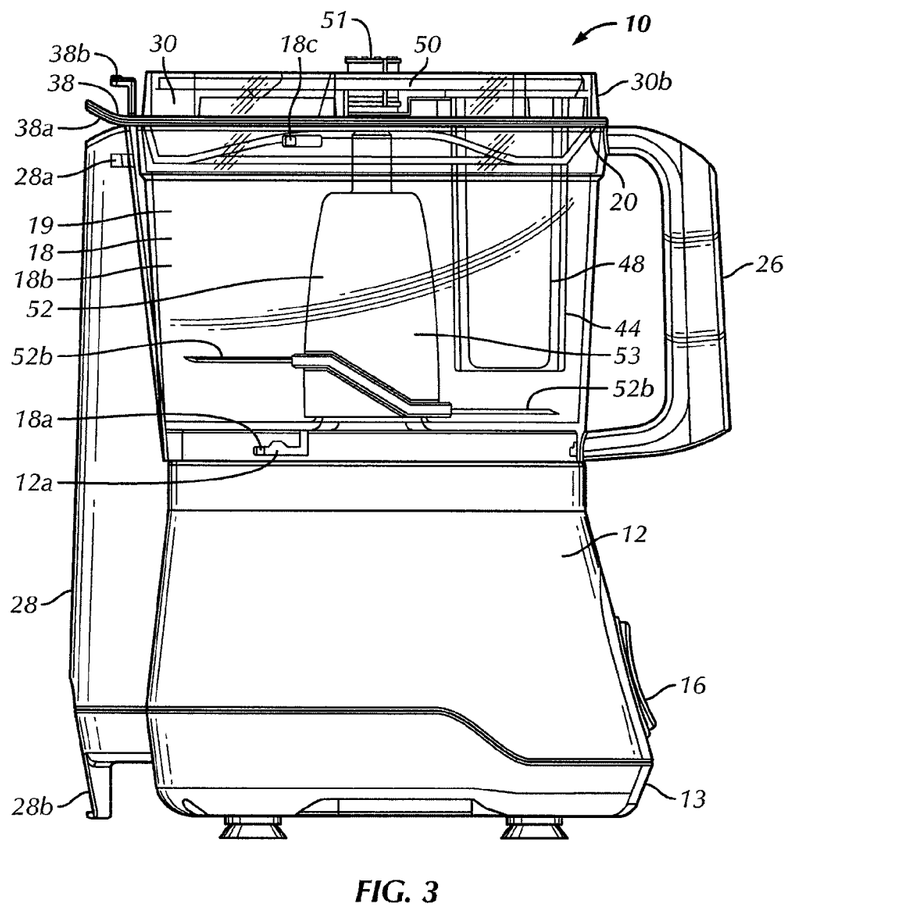
FIG. 3 is a left side elevation view of food processor shown in FIG. 2.

Referring to FIGS. 1-3, the container 18 is removably mountable on the base 12. The container 18 has a side wall 18b and an open end including the rim 20. The container 18 has a generally cylindrical shape and further includes a generally circular bottom wall 22 integral with and generally perpendicular to the side wall 18b. The container 18 has a plurality of protrusions 18a, proximate the bottom wall 22, extending inwardly from an interior surface of the side wall 18b and which slidingly engage with corresponding slots 12a formed in an exterior side wall of the base 12, proximate the top of the base 12, to retain the container 18 on the base housing 12. Extending upwardly from the center of the bottom wall 22 of the container 18 is a generally cylindrical central tube 24 sized to accommodate the drive shaft 14 extending therethrough when the container 18 is secured to the base 12 in an assembled position, as shown in FIG. 1. Preferably, at least a portion of the drive shaft 14 extends above a top edge of the central tube 24 when the food processor 10 is in the assembled position.

The interior surfaces of the side wall 18b and the bottom wall 22 generally define an interior of the container 18. A handle 26 is integrally molded to the side wall 18b and extends outwardly therefrom to provide the user with a gripping surface with which to pick up, carry, and otherwise handle the container 18. Although the container 18 and base housing 12 are described as being generally cylindrical in shape, it will be understood by those skilled in the art that both components may be of a different shape as long as they are able to perform their generally intended functions. For example, the container 18 and base housing 12 may be ovular in shape.

As shown in FIG. 3, a support post 28 extends along the side of the base 12 and the container 18, such that the support post 28 is positioned opposite, or 180 degrees from, the handle 26 when the container 18 is mounted and secured on the base 12. One end of the support post 28 is equipped with a supporting member in the form of a leg 28b which supports the food processor 10 and serves to keep the food processor 10 stable. It will be understood by those skilled in the art that the supporting member may be in various other forms, such as a prop, stump, post, etc.

Figure 4:
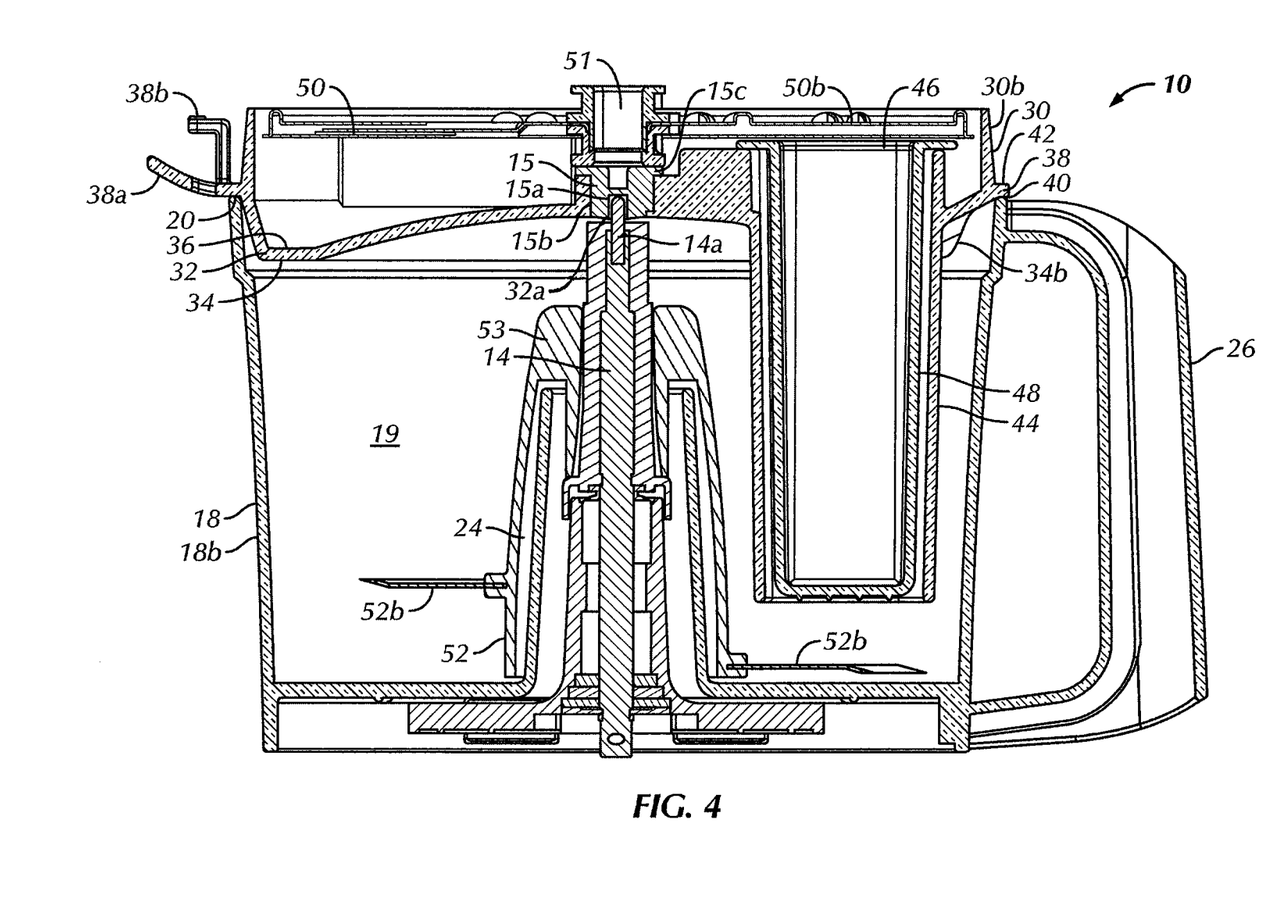
FIG. 4 is a cross sectional view of some components of the food processor shown in FIG. 2.
Figure 5:
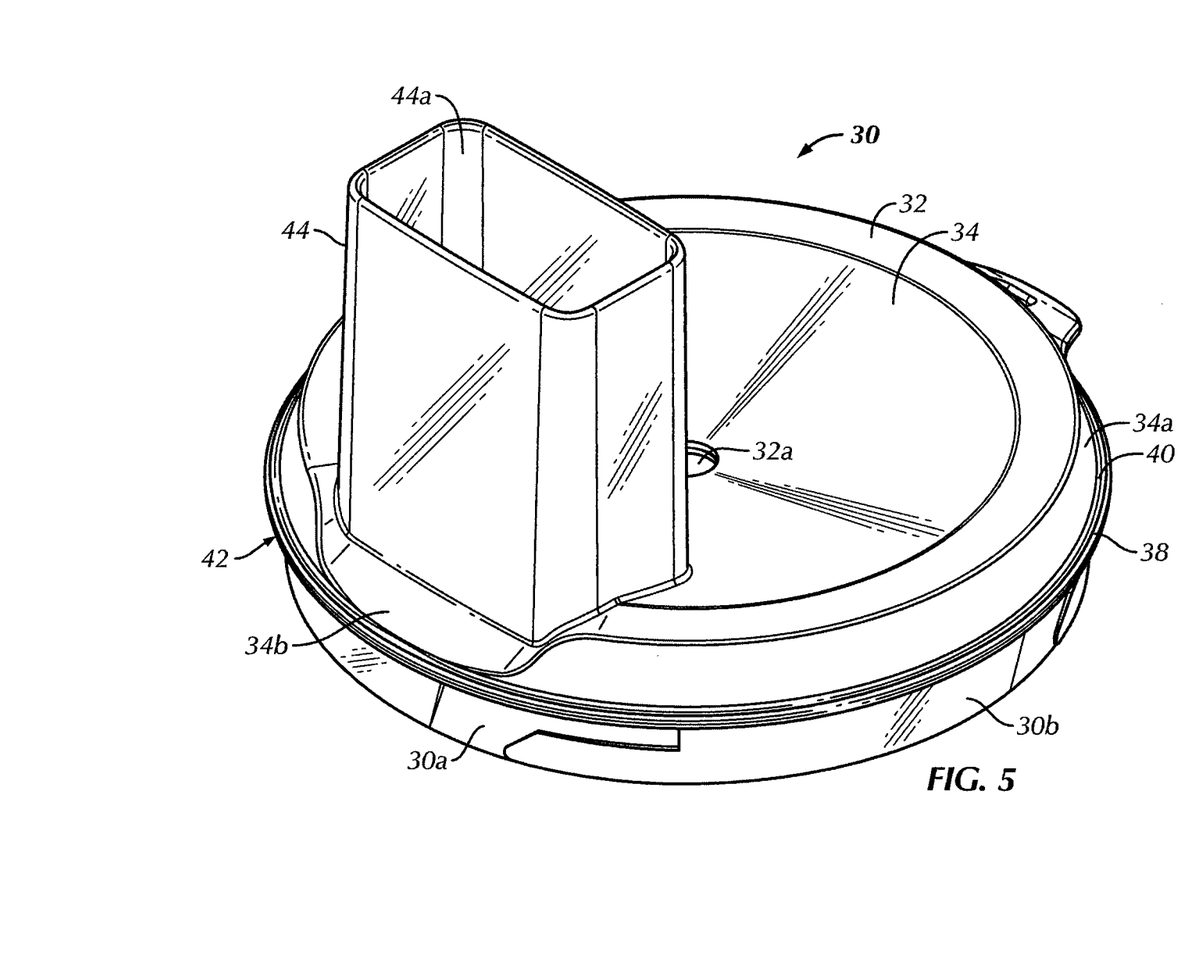
FIG. 5 is a top perspective view of a lid of the food processor shown in FIG. 1.
Figure 6:
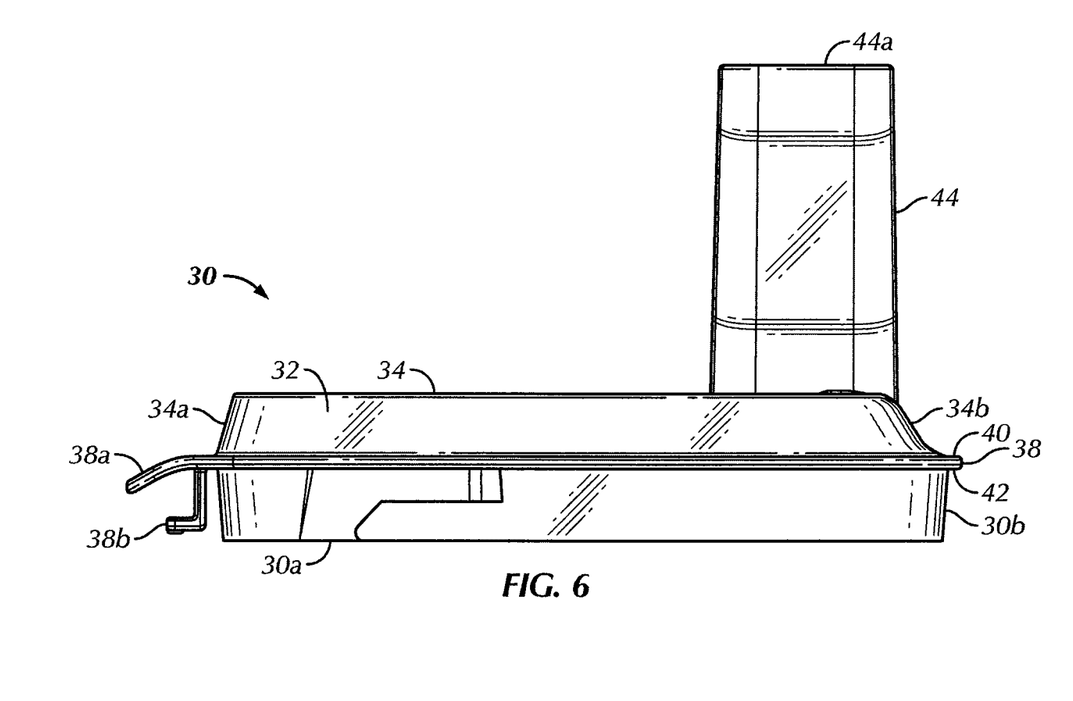
FIG. 6 is a left side elevation view of the lid shown in FIG. 5.

Referring to FIGS. 1, 5 and 6, the lid 30 engages with the open end of the container 18. More particularly, the lid 30 is removably securable to the rim 20 of the container 18. The lid includes a top wall 32 having a first principal surface 34 and a second principal surface 36 (see FIG. 4). The first principal surface 34 corresponds with a exterior surface of the top wall 32, while the second principal surface 36 corresponds to an interior surface of the top wall 32. However, it will be understood by those skilled in the art that such meanings have been attached to these surfaces solely for illustrative purposes and the opposite meaning may be associated with each surface.

The lid 30 further includes a side wall 30b which has an annular ledge 38 formed on an exterior surface thereof. The sidewall 30b is integral with and extends downwardly from an outer edge of the top wall 32. The annular ledge extends continuously around and radially outwardly from the outer periphery of the sidewall 30b. The annular ledge 38 has a generally flat surface on a first, or top, side 40, and on a second, or bottom, side 42. It will be understood by those skilled in the art that while this component is referred to throughout the specification as an annular ledge, the component may be described by a variety of terms, such as a lip, a shelf, annular protrusion, etc. One end 38a of the annular ledge 38 is slightly curved and extends farther away from the side wall 30b than the other end. At the end 38a, a locking tang 38b, which is generally L-shaped, extends away from the surface of the second side 42. The slightly curved end 38a and locking tang 38b are provided to removably engage with the support post 28 when the food processor 10 is in an assembled position, as described in more detail below.

Alternatively, the annular ledge 38 may be discontinuous, such that the annular ledge 38 is made up of a plurality of spaced-apart protrusions (not shown) which extend outwardly away from the sidewall 30b. Each protrusion has a generally flat surface on a first and second side, corresponding to the first or top side 40 and second or bottom side 42, respectively, of the annular ledge 38.

A food chute 44 extends outwardly or upwardly away from the first principal surface 34 of the top wall 32 in a direction generally parallel to a longitudinal axis of the top wall 32 and generally perpendicular to the top wall 32 of the lid 30. The food chute 44 surrounds an aperture 46 formed in the top wall 32 and is generally rectangular in shape (see FIG. 4-6). The food chute 44 is located off-center on the first principal surface 34 of the top wall 32, between a center and the outer edge of the top wall 32. Further, a portion of the food chute 44 extends downwardly away from the second principal surface 36 of the top wall 32, such that a portion of the food chute 44 extends toward the interior of the container 18 when the lid 30 is in the operation position, shown in FIG. 1.

In the operating position, a plurality of protrusions 18c, located proximate the open end of the container 18 and extending inwardly from the interior surface of the side wall 18b, slidingly engage with corresponding slots 30a formed in the side wall 30b of the lid 30, in order to retain the lid 30 on the container 18. In the operating position, the curved end 38a rests on the top end of the support post 28 and the locking tang 38b slidingly engages with a slot 28a formed in the support post 28. When the lid 30 is secured to the container 18 as such, the length of the food chute 44 extends away from the container 18 and the second side 42 of the annular ledge 38 contacts the rim 20 of the open end of the container 18. Thus, the food chute 44 provides a passageway from a mouth 44a at the top of the food chute to the aperture 46 in the top wall 32, through which foodstuff may be inserted into the container 18. When the lid 30 is secured to the container 18, the interior of the container 18 and the second principal surface 36 of the lid 32 define a processing chamber 19, wherein the foodstuff entering from the food chute 44 is processed by one or more processing tools, such as a food pusher 48, a processing disc 50, and/or a rotatable blade 52.

The food pusher 48 may be used to facilitate the introduction of foodstuff into the processing chamber 19 through the food chute 44. To do so, the food pusher 48 is removably inserted into the food chute 44 in a repeated fashion. Alternatively, food may be placed directly into the container 18 before the lid 30 is secured to the container 18.

The processing disc 50 may be used for slicing and shredding purposes. The processing disc 50 is preferably a generally circular metallic disk having a slicing surface 50a and an opposing shredding surface 50b. The processing disc 50 further includes a central spindle 51 for engagement with the drive shaft 14. In operation, the disc 50 is positioned within the container 18, such that the central spindle 51 is engaged with the drive shaft 14, and then the locking member 15 is placed over the terminal end 14a to removably secure to the processing disc 50 to the drive shaft 14. When the motor is turned on, the disc 50 rotates and either slices or shreds foodstuff being introduced into the processing chamber 19 through the food chute 44.

The rotatable blade 52 may be used for various other processing operations for processing foodstuff. The rotatable blade 52 is preferably a S-blade including a sleeve 53 and a pair of sickle-shaped blades 52b with cutting edges. In the operating position, the sleeve 53 of the rotatable blade 52 is disposed over the drive shaft 14 and the central tube 24. A portion of the drive shaft, including the terminal end 14a, extends above the sleeve 53. The locking member boss 15 is then secured to the terminal end 14a to removably secure the rotatable blade 52 to the drive shaft 14. When the motor is turned on, the blade 52 rotates and the cutting edges of the blades 52b chop or otherwise process foodstuff contained within the processing chamber 19.

When the food processor 10 is not in use, the structure of the lid 30 allows for easy and compact storage of the food processor 10 and all of its associated components. Particularly, the lid 30 is configured to engage the rim 20 of the open end of the container 18 in either the operating or the storage position. In the storage position, shown in FIGS. 2-4, the lid 30 may be inverted and placed on top of the rim 20 of the container 18, such that the first principal surface 34 of the top wall 32 fits comfortably within the interior of the container 18. More preferably, the entire top wall 32 of the lid 30 is disposed completely within the container 18 when the lid 30 is in the storage position.

As best shown in FIG. 3, in the inverted position, a portion of the drive shaft 14 extends through the aperture 32a of the top wall 32, the food chute 44 extends into the interior of the container 18, and the first or top side 40 of the annular ledge 38 contacts the rim 20 of the open end of the container 18. Once the lid 30 is inverted as such, the locking member 15 may be secured to the terminal end 14a of the drive shaft 14, thereby essentially covering the aperture 32a and securely retaining the lid 30 in the storage position. Further, when the lid 30 is in the storage position, the container 18 accommodates the entire length of the food chute 44 extending from the first principal surface 34 of the top wall 32, such that the lid 30 sits comfortably on top of the rim 20 of the container 18.

The lid 30 is capable of being inverted and stored as such because the outer periphery 34a of the first principal surface 34 is tapered inwardly, such that the diameter of the first principal surface 34 is smaller than that of the open end of the container 18. More particularly, a portion 34b of the outer periphery 34a proximate the food chute 44 is curved inwardly. However, it will be understood by those skilled in the art that the taper may be angular, rounded, etc. Thus, the top wall 32 of the lid 30 is capable of comfortably passing through the open end of the container 18 and of fitting within the container 18 when the lid 30 is in the inverted position. Also, because the annular ledge 38 contacts the rim 20 in the storage position, the entire length of the lid 30 is prevented from being contained within the container 18. Rather, the ledge 38 retains a portion of the lid 30 above the rim 20. Thus, there is sufficient space in the interior of the container 18 for the container 18 to accommodate the entire length of the food chute 44 extending from the first principal surface 34 of the top wall 32.

Further, when the lid 30 is in the storage position, the various processing tools 48, 50, 52 may be stored at least partially within the lid 30, as shown in FIGS. 2-4. For example, before the lid 30 is inverted and placed on the container 18, the rotatable blade 52 may be positioned on the drive shaft 14, just as if the food processor 10 were being assembled into the operating position. Then, the lid 30 may be inverted and placed on the container 18, and the locking member 15 may be secured to the terminal end 14a of the drive shaft 14, thereby retaining the lid in the inverted position. Next, the food pusher 48 may be stored within the interior of the food chute 44 by inserted the food pusher 48 into the aperture 46 in the top wall 32 of the lid 30, such that the entire length of the food pusher 48 is accommodated by the container 18. Finally, the processing disc 50 may be stored within the interior of the lid 30 against the upwardly exposed second principal surface 36 of the top wall 32 of the lid 30. As best shown in FIG. 4, in the above-described configuration, the processing disc 50 covers the food pusher 48 and the spindle 51 of the processing disc 50 is in contact with the locking member 15. The container 18 may be secured to the base 12 or may be stored separately therefrom. Thus, all of the food processor components may be stored in an efficient and compact manner when the food processor is not in use. Also, because the annular ledge 38 contacts the rim 20 in the storage position, a portion of the lid 30 is maintained above the rim 20 when the lid 30 is in the storage position, such that a user may readily grasp the lid 30 to remove the lid 30 from the container 18.

It will be appreciated by those skilled in the art that changes could be made to the embodiments described above without departing from the broad inventive concept thereof. It is understood, therefore, that this invention is not limited to the particular embodiments disclosed, but is intended to cover modifications within the spirit and scope of the present invention as described by the appended claims.

I claim:

1. A food processor including a base, a container having a side wall and an open end including a rim, and a lid for engaging the open end of the container in an operating position and storage position, the lid comprising:
    a top wall having a first principal surface and a second principal surface, the first principal surface comprising a diameter that is less than a diameter provided by the open end of the container;
    a sidewall with an outer periphery, the sidewall further comprising an annular ledge having a first side and a second side, the annular ledge extending radially outwardly from the outer periphery of the sidewall; and
    a food chute extending from the first principal surface of the top wall generally parallel to a longitudinal axis of the top wall, the food chute having a length and extending away from the container with the second side of the annular ledge contacting a top surface of the rim of the open end of the container when the lid is in the operating position, and the food chute extending into an interior of the container with the first side of the annular ledge contacting the top surface of the rim of the open end of the container when the lid is in the storage position.

2. The food processor of claim 1 wherein the food chute surrounds a first aperture formed in the top wall.

3. The food processor of claim 1, wherein the container accommodates the entire length of the food chute when the lid is in the storage position.

4. The food processor of claim 1, wherein the outer periphery of the first principal surface of the lid is tapered inwardly, such that when the lid is on the container in the storage position, the first principal surface fits comfortably within the interior of the container.

5. The food processor of claim 1, wherein the top wall of the lid is disposed completely within the container when the lid is in the storage position.

6. The food processor of claim 1, wherein a drive shaft extends through a second aperture formed in the top wall when the lid is in the storage position.

7. The food processor of claim 1, wherein one or more processing tools may rest at least partially within the lid when the lid is in the storage position.

8. The food processor of claim 7, wherein the processing tools include at least one of a food pusher and processing disc.

9. The food processor of claim 1, wherein the annular ledge first edge and second edge define a generally flat surface.

10. A food processor including a base, a container having a side wall and an open end including a rim, and a lid for engaging the open end of the container, the lid comprising:
- a top wall having a first principal surface and a second principal surface, the first principal surface comprising a diameter that is less than a diameter provided by the open end of the container;
- an annular ledge having a first side and a second side;
- a food chute extending from the first principal surface of the top wall generally parallel to a longitudinal axis of the top wall, the food chute having a length and extending away from the container with the second side of the annular ledge contacting a top surface of the rim of the open end of the container when the lid is in the operating position, and the food chute extending into an interior of the container with the first side of the annular ledge contacting the top surface of the rim of the open end of the container when the lid is in the storage position;
- a drive shaft extends through a second aperture formed in the top wall when the lid is in the storage position; and
- a locking member is secured to the drive shaft to secure the lid in the storage position.

11. The food processor of claim 10, wherein the container accommodates the entire length of the food chute when the lid is in the storage position.

12. The food processor of claim 10, wherein the outer periphery of the first principal surface of the lid is tapered inwardly, such that when the lid is on the container in the storage position, the first principal surface fits comfortably within the interior of the container.

13. A food processor including a base, a container having a side wall and an open end including a rim, and a lid for engaging the open end of the container in an operating position and storage position, the lid comprising;
- a top wall having a first principal surface, a second principal surface and an outer periphery of the first principal surface of the lid that is tapered inwardly, the first principal surface comprising a diameter that is less than a diameter provided by the open end of the container;
- an annular ledge having a first side and a second side;
- a food chute extending from the first principal surface of the top wall generally parallel to a longitudinal axis of the top wall, the food chute having a length and extending away from the container with the second side of the annular ledge contacting a top surface of the rim of the open end of the container when the lid is in the operating position, and the food chute extending into an interior of the container with the first side of the annular ledge contacting the top surface of the rim of the open end of the container when the lid is in the storage position; and
- wherein the first principal surface fits comfortably within the interior of the container when the lid is on the container in the storage position and wherein at least one of a food pusher and a processing disk are at least partially within the lid when the lid is in the storage position.

* * * * *